(12) United States Patent
Bokelman et al.

(10) Patent No.: US 7,995,234 B2
(45) Date of Patent: Aug. 9, 2011

(54) ADJUSTING SCAN RATE WITHIN SCANNING DEVICE

(75) Inventors: Kevin Bokelman, San Diego, CA (US); Ryan M. Smith, San Diego, CA (US); Edward A. Hill, Oceanside, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 442 days.

(21) Appl. No.: 11/831,846

(22) Filed: Jul. 31, 2007

(65) Prior Publication Data

US 2009/0034020 A1   Feb. 5, 2009

(51) Int. Cl.
*G06K 15/00* (2006.01)
*H04N 1/04* (2006.01)
*H04N 1/36* (2006.01)

(52) U.S. Cl. .................. 358/1.16; 358/486; 358/412

(58) Field of Classification Search .......... 358/505, 358/504, 1.16, 1.18, 1.5, 1.9, 474, 486, 488, 358/496, 497, 412, 426.03; 355/401, 407, 355/408

See application file for complete search history.

(56) References Cited

U.S. PATENT DOCUMENTS

| | | | |
|---|---|---|---|
| 4,160,279 A * | 7/1979 | Fuwa | 358/474 |
| 4,233,636 A * | 11/1980 | Harbaugh et al. | 358/480 |
| 4,748,514 A * | 5/1988 | Bell | 358/486 |
| 4,835,618 A * | 5/1989 | Shimizu | 358/401 |
| 4,878,119 A * | 10/1989 | Beikirch et al. | 358/471 |
| 5,040,079 A * | 8/1991 | Shimizu | 358/451 |
| 5,392,135 A * | 2/1995 | Amemiya | 358/444 |
| 5,481,365 A * | 1/1996 | Arimoto | 358/296 |
| 5,517,331 A * | 5/1996 | Murai et al. | 358/486 |
| 5,619,424 A * | 4/1997 | Cookson et al. | 348/14.14 |
| 5,668,637 A * | 9/1997 | Yamaguchi | 358/296 |
| 6,404,507 B1 * | 6/2002 | Hamamoto et al. | 358/1.5 |
| 6,496,274 B1 * | 12/2002 | Telle | 358/1.1 |
| 6,771,888 B1 * | 8/2004 | Cookson et al. | 386/95 |
| 6,788,438 B2 * | 9/2004 | Takahashi et al. | 358/483 |
| 6,956,963 B2 * | 10/2005 | Ulrich et al. | 382/154 |
| 7,187,477 B2 | 3/2007 | Chen | |
| 7,729,017 B2 * | 6/2010 | Owens et al. | 358/474 |
| 2006/0119905 A1 | 6/2006 | Chang | |
| 2006/0291010 A1 * | 12/2006 | Wang | 358/486 |
| 2007/0070435 A1 * | 3/2007 | Wang | 358/426.03 |
| 2007/0171488 A1 | 7/2007 | Chen | |
| 2008/0123149 A1 * | 5/2008 | Mimamino et al. | 358/3.26 |

* cited by examiner

*Primary Examiner* — Madeleine A Nguyen

(57) ABSTRACT

A scanning device includes a scanning mechanism, a memory, a processing mechanism, and a scan rate adjustment mechanism. The scanning mechanism scans a media sheet having an image thereon at a variable scan rate, to yield raw data. The memory temporarily stores the raw data. The processing mechanism converts the raw data within the memory into processed data. The raw data is removed from the memory as the raw data is converted. The scan rate adjustment mechanism adjusts the variable scan rate, based on one or more of an amount of free space within the memory, a fill rate at which the raw data is filling the memory, and a removal rate at which the raw data is being removed from the memory, so that the memory does not become completely full.

16 Claims, 4 Drawing Sheets

ADJUSTING SCAN RATE WITHIN SCANNING DEVICE

BACKGROUND

A scanning device, such as a scanner, typically optically scans a media sheet having an image thereon, where the image may include text, to generate an electronic version of the image. The electronic version, for instance, may be a JPG file or a TIF file. The scanning mechanism of a scanning device, such as an optical sensor, may be relatively moved vis-à-vis the media sheet, such as on a swath-by-swath (e.g., line-by-line) basis. The raw data from the optical sensor is temporarily stored in a memory buffer. A second mechanism removes the raw data from the memory buffer to generate processed data that can represent the electronic version of the image on the media sheet.

The scanning mechanism, however, may generate the raw data more quickly than the second mechanism is able to convert the raw data into the processed data. This can mean that at some point during scanning of the media sheet, the memory buffer becomes full. At this time, the scanning mechanism typically stops scanning, until there is sufficient space within the memory buffer to store raw data, at which point the scanning mechanism starts scanning again. However, such stopping and restarting of the scanning mechanism can result in artifacts being generated within the electronic version of the image on the media sheet, because it can be difficult to start scanning at the precise location at which scanning had previously stopped.

DETAILED DESCRIPTION OF THE DRAWINGS

Figure 1:
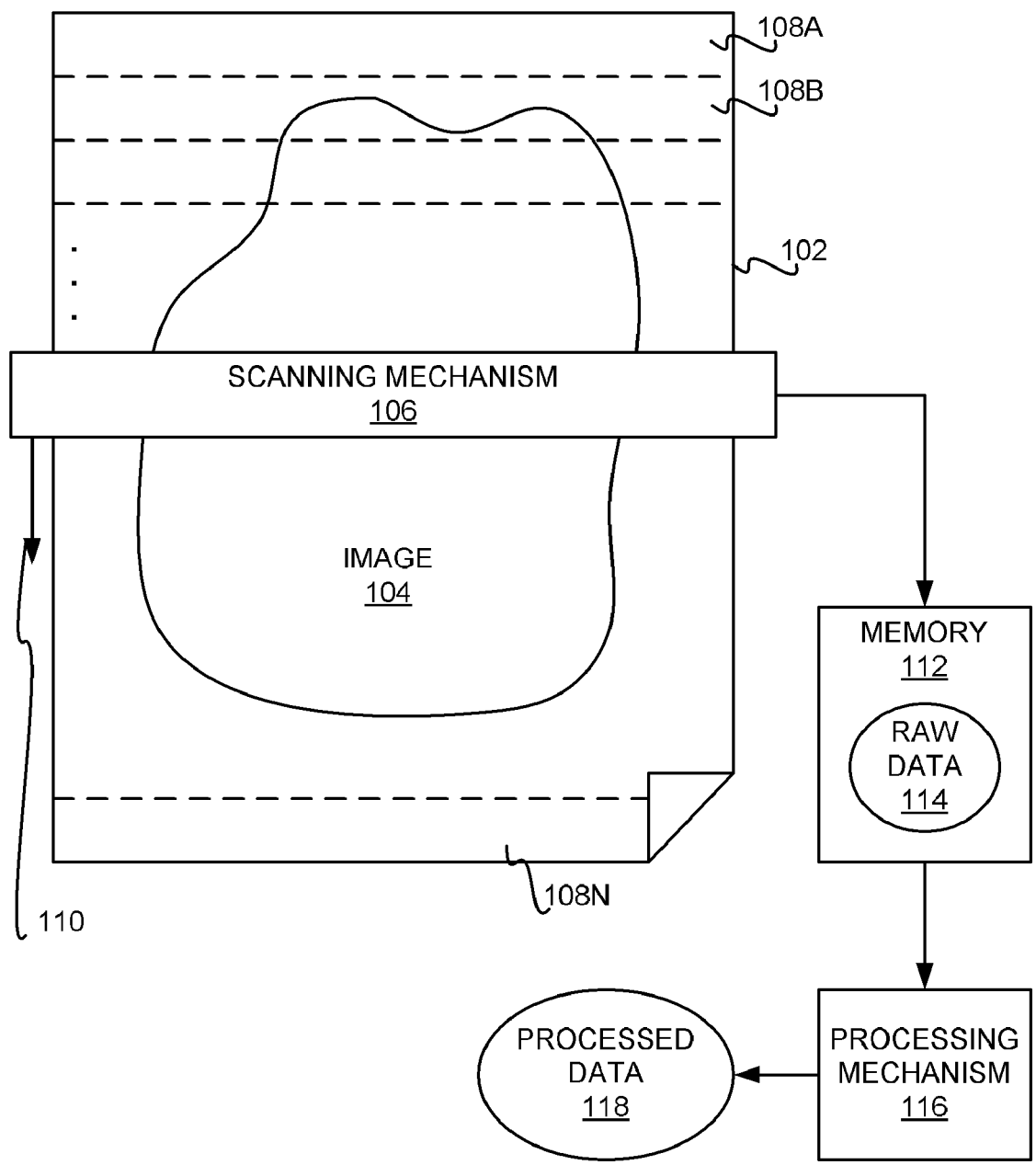
FIG. 1 is a diagram illustratively depicting a process by which a media sheet having an image thereon is scanned, according to an embodiment of the present disclosure.

FIG. 1 illustratively depicts a process by which a media sheet 102 having an image 104 thereon is scanned, according to an embodiment of the present disclosure. The media sheet 102 may be a physical sheet of paper, or another type of media sheet. The image 104 may have been printed on the media sheet 102, by a laser-printing device, an inkjet-printing device, or another type of printing device, for instance. The image 104 may include graphics and/or text, and may be in color, black and white, or in grayscale.

A scanning mechanism 106 may be an optical scanning mechanism. The scanning mechanism 106 scans the media sheet 102 to ultimately generate an electronic version of the image 104 on the media sheet 102. This electronic version may be an electronic data file in JPG format, in TIF format, or another type of format.

The scanning mechanism 106 does not scan the entire media sheet 102 at one time. Rather, the scanning mechanism 106 scans the media sheet 102, in one embodiment, on a swath-by-swath basis. For example, the media sheet 102 can be considered as being logically divided from top to bottom into a number of media swaths 108A, 108B, . . . , 108N, collectively referred to as the media swaths 108. A media swath can be defined in one embodiment as a line of the media sheet 102. That is, a media swath can be defined as extending from the left edge to the right edge of the media sheet 102, and having a particular height. An example of such a height may be one or more pixels. The media swath can correspond to a portion of the media sheet 102 that the scanning mechanism 106 is able to scan at one time.

Therefore, the scanning mechanism 106 starts at the first swath 108A, scans the first swath 108A, proceeds to the second swath 108B, scans the second swath 108B, and so on, until all the media swaths 108 have been scanned. In one embodiment, the media sheet 102 remains stationary during the scanning process, and the scanning mechanism 106 is moved from swath to swath so that the mechanism 106 ultimately is positioned incident to all the swaths 108 at different points in time. In another embodiment, the scanning mechanism 106 remains stationary during the scanning process, and the media sheet 102 is moved so that the mechanism 106 ultimately is positioned incident to all the swaths 108 at different points in time. In either case, it can be said that the scanning mechanism 106 relatively moves in relation to the media sheet 102, such as in the direction indicated by the arrow 110.

Each time the scanning mechanism 106 scans one of the swaths 108, the mechanism 106 generates raw data 114 that is temporarily stored within a memory 112. The memory 112 may thus be considered a memory buffer. The data 114 is raw in that it is the data output by the scanning mechanism 106, without having been processed in any way. As such, a processing mechanism 116 retrieves the raw data 114 from the memory 112, and converts the raw data 114 into processed data 118. The processed data 118 may thus be the electronic version of the image 104 on the media sheet 102, in JPG, TIF, or another format.

The memory 112 is typically not large enough to store all the raw data 114 generated by the scanning mechanism 106 scanning all the media swaths 108. As such, as the raw data 114 is generated, the processing mechanism 116 retrieves the raw data 114 from the memory 112 and generates the processed data 118. As the raw data 114 is retrieved by the processing mechanism 116 from the memory 112, the raw data 114 is removed from the memory 112. However, the processing mechanism 116 may not be able to process the raw data 114 as quickly as the scanning mechanism 106 is able to generate the raw data 114. As such, the memory 112 may ultimately become completely full with raw data 114, resulting in the scanning mechanism 106 having to stop scanning and wait for the processing mechanism 116 to remove and process sufficient of the raw data 114 to free up space within the memory 112, so that the mechanism 106 can again start scanning.

Therefore, to avoid the scanning mechanism 106 from having to stop and restart scanning one or more times during the scanning process of the media sheet 102, embodiments of the invention adjust the scan rate at which the scanning mechanism 106 scans the media sheet 102. Desirably, the scanning mechanism 106 scans substantially as fast as the processing mechanism 116 is able to process the raw data 114, so that the scanning mechanism 106 does not have to completely stop scanning. Thus, the memory 112 temporarily storing the raw data 114 does not become completely full. There may be circumstances under which the memory 112 may become completely full, but such an occurrence exists for just a moment in time, just as, for instance, the processing mechanism 116 is about to remove some of the raw data 114 for processing. However, even in such an instance, then, the scanning mechanism 106 does not completely stop scanning.

The scan rate of the scanning mechanism 106 may be considered the speed at which the scanning mechanism 106 scans the media sheet 102 on a swath-by-swath basis. As such, the scan rate may correspond to the speed or velocity by which the scanning mechanism 106 or the media sheet 102 itself is moved. The scan rate may be controlled in one embodiment by controlling how quickly the scanning mechanism 106 relatively proceeds from swath to swath down the media sheet 102.

Figure 2:
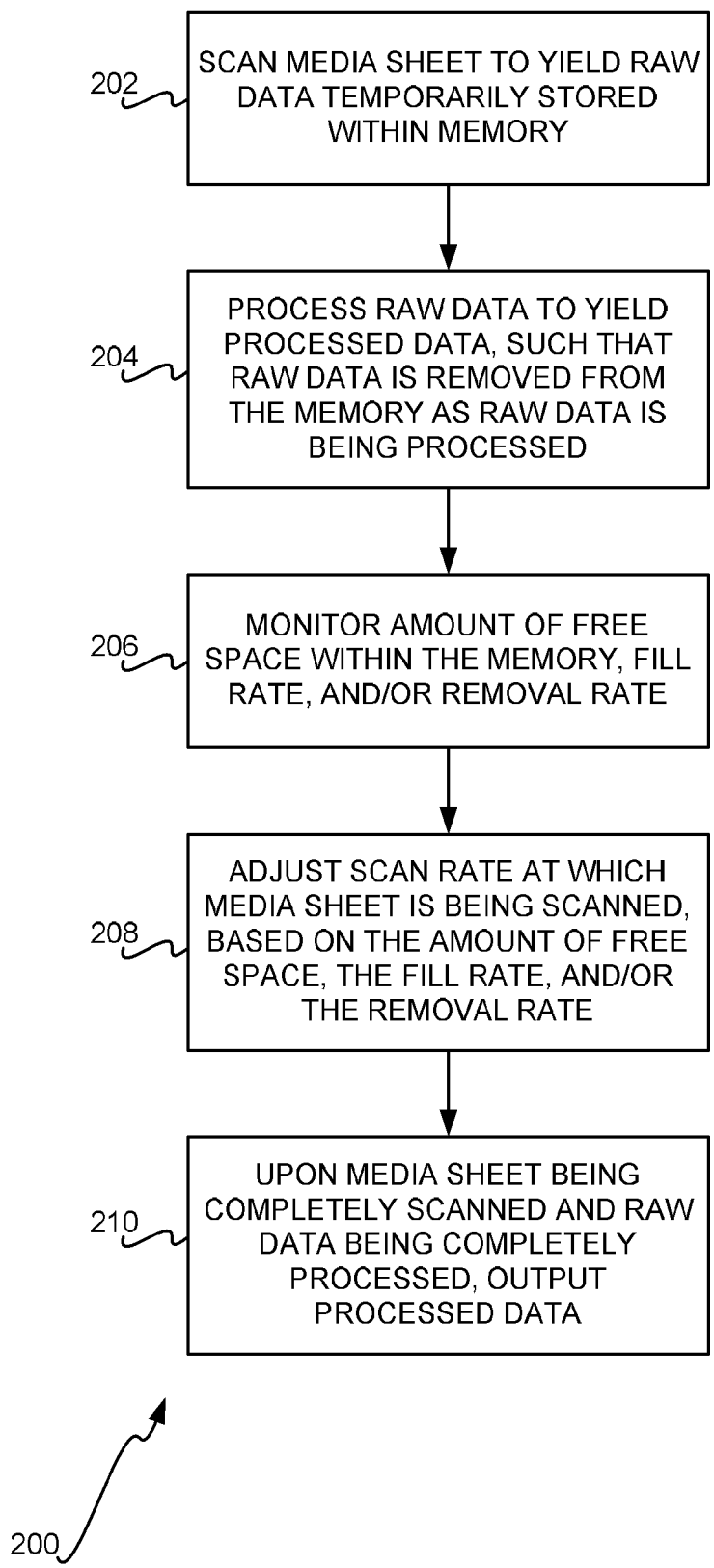
FIG. 2 is a flowchart of a method for scanning a media sheet having an image thereon, according to an embodiment of the present disclosure.

FIG. 2 shows a method 200 for scanning the media sheet 102 so that the memory 112 does not become completely full, according to an embodiment of the present disclosure. The method 200, as well as other methods of embodiments of the present disclosure, can be implemented by one or more computer programs stored on a computer-readable medium. The computer-readable medium may be a tangible computer-readable medium, such as a volatile or a non-volatile memory, a semiconductor memory, a magnetic medium like a hard disk drive, an optical medium like an optical disc, and/or another type of computer-readable medium.

The method 200 scans the media sheet 102 that has the image 104 thereon to yield the raw data 114 that is temporarily stored within the memory 114 (202). For instance, the method 200 may cause the scanning mechanism 106 to optically scan the media sheet 102 on a media sheet swath-by-media sheet swath basis. The scanning mechanism 106 may be movable, and the media sheet 102 remain stationary, or vice-versa, as has been described.

Upon the raw data 114 starting to be stored within the memory 112, the method 200 processes the raw data 114 to yield the processed data 118 (204), such that the raw data 114 is removed from the memory 112 as the raw data 114 is processed. For instance, the method 200 may cause the processing mechanism 116 to process the raw data 114 to yield the processed data 118. It is noted that both the raw data 114 and the processed data 118 can be considered as corresponding to the image 104 on the media sheet 102, where the former data is raw in that it can be the raw output from the scanning mechanism 106, and the latter data is processed in that it can be an electronic version of the image 104 in TIF, JPG, or another format.

While parts 202 and 204 are being performed, the method 200 monitors the amount of free space within the memory 112, a fill rate at which the raw data 114 is filling the memory resulting from scanning of the media sheet 102, and/or a removal rate at which the raw data 114 is being removed from the memory resulting from processing of the raw data 114 (206). The amount of free space within the memory 112 increases when the removal rate is greater than the fill rate, and decreases when the fill rate is greater than the removal rate. The fill rate can thus be the rate at which the scanning mechanism 106 generates the raw data 114 and stores the raw data 114 within the memory 112, while scanning the media sheet 102. The removal rate likewise can the rate at which the processing mechanism 116 processes the raw data 114 to yield the processed data 118, such that the raw data 114 is being removed from the memory 112.

While parts 202, 204, and 206 are being performed, the method 200 adjusts the scan rate at which the media sheet 102 is being scanned, based on the amount of free space within the memory 112, the fill rate, and/or the removal rate (208). The scan rate is adjusted so that the memory 112 does not come completely full. That is, the scan rate is adjusted so that the scanning mechanism 106 does not have to be stopped from scanning the media sheet 102 until the entire media sheet 102 has been scanned. The scan rate can be adjusted downwards, so scanning is performed more slowly, when the amount of free space within the memory 112 decreases, which occurs when the removal rate is less than the fill rate. Likewise, the scan rate can be adjusted upwards, so scanning is performed more quickly, when the amount of free spaces within the memory 112 increases, which occurs when the fill rate is less than the removal rate.

In one embodiment, the scan rate may be adjusted in part 208 continually (i.e., continuously), such that the scan rate is dynamically variable, and can be modified at any time. In another embodiment, the scan rate may be adjusted in part 208 at discrete intervals. After each such interval of time expires, the scan rate is adjusted based on the amount of free space within the memory 112, the fill rate, and/or the removal rate. In this latter embodiment, the scan rate may be considered as being adjusted discretely, in that the scan rate is periodically adjusted, as opposed to being continually or continuously adjusted as in the former embodiment.

Once the media sheet 102 has been completely scanned and the raw data 114 has been completely processed, the finished processed data 118 is output (210). For example, the electronic version of the image 104 on the media sheet 102 to which the processed data 118 corresponds may be stored on a storage device, for manipulation, transmission, archival, and so on, by a user. As another example, the processed data 118 may be displayed to the user on a display device, such as a display device connected to or a part of a computing device to which the scanning mechanism 106 is also connected. Other types of output can also be performed in part 210.

Figure 3:
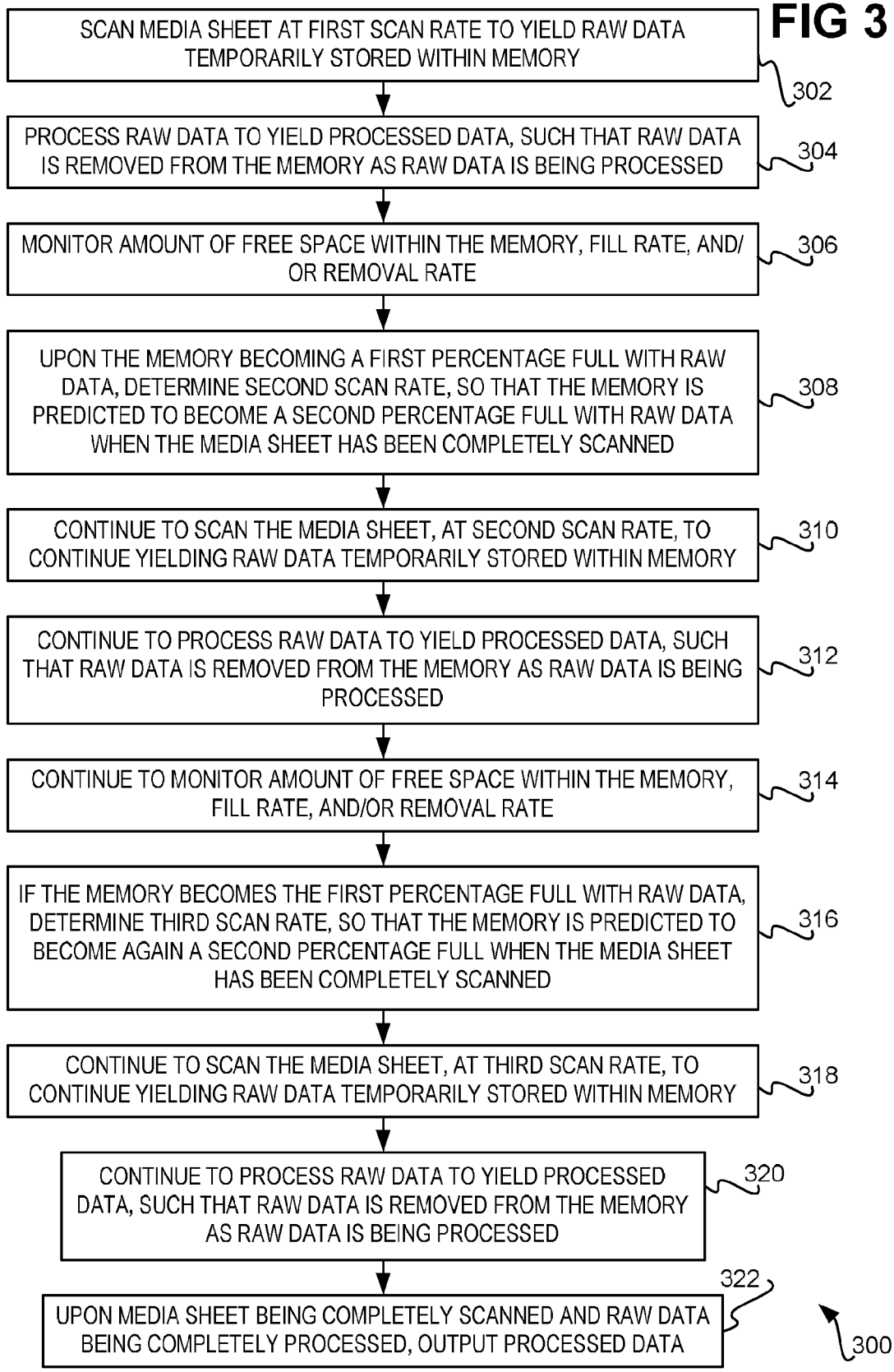
FIG. 3 is a flowchart of a method for scanning a media sheet having an image hereon, according to another embodiment of the present disclosure

FIG. 3 shows a method 300 for scanning the media sheet 102 so that the memory 112 does not become completely full, according to another embodiment of the present disclosure. The method 300 may be considered a particular implementation of the method 200. The method 300 particularly adjusts the scan rate at one or more discrete intervals denoted by the amount of free space remaining within the memory 112. The method 300 may be considered as presuming that, at least initially, the fill rate of the raw data 114 into the memory 112 is greater than the removal rate of the raw data 114 from the memory 112.

The media sheet 102 is initially scanned at a first scan rate to yield the raw data 114 which is temporarily stored within the memory 112 (302). This first scan rate may be considered the fastest rate at which the scanning mechanism 106 can scan the media sheet 102 and generate the raw data 114. Upon the raw data 114 starting to be stored within the memory 112, the raw data 114 is processed to yield the processed data 118 (304), such that the raw data 114 is removed from the memory 112 as the raw data 114 is processed. While parts 302 and 304 are being performed, the method 300 may monitor the amount of free space remaining within the memory 112, the fill rate, and/or the removal rate (306), as has been described.

Where the fill rate of the raw data 114 into the memory 112 is greater than the removal rate of the raw data 114 from the memory 112, the memory 112 becomes a first percentage full with the raw data 114, such that a second scan rate is determined (308). The first percentage may be 80%, or another percentage. The second scan rate is determined based on the amount of free spacing remaining within the memory 112, the fill rate, and/or the removal rate, so that the memory 112 is predicted to become a second percentage full with the raw data 114 when the scanning mechanism 106 has completed scanning of the entire media sheet 102. The second percentage may be 20%, or another percentage. Thus, in one embodiment, when the memory 112 is 80% full, the scan rate is adjusted downwards so that, based on the fill rate and/or the removal rate monitored thus far, it is predicted that the memory 112 will be just 20% full when the scanning mechanism 106 has completely scanned the media sheet 102.

The media sheet 112 therefore is continued to be scanned, but at the second scan rate that is likely less than the first scan rate, to continue yielding the raw data 114 that is temporarily stored within the memory (310). Likewise, the raw data 114 is continued to be processed, to continue to yield the processed data 118 (312), such that the raw data 114 is removed from the memory 112 as the raw data 114 is processed. The amount of free space remaining within the memory 112, the fill rate, and/or the removal rate are also continued to be monitored (314).

In some situations, the second scan rate may still be sufficiently fast to result in the memory 112 again becoming the first percentage full. For example, when part 308 is performed, the image 104 on the media sheet 102 may have been substantially blank (i.e., a relatively static image density), such that the fill rate is unusually low and/or the removal rate is unusually high. Thereafter, when parts 310, 312, and 314 are being performed, the memory 112 may again become the first percentage full. For instance, the image 104 on the media sheet 102 may have since become substantially varied (i.e., a relatively dynamic image density), such that the fill rate increases and/or the removal rate decreases.

Therefore, if the memory 112 becomes again becomes the first percentage full with the raw data 114 (316), then a third scan rate is determined. The third scan rate is determined based on the amount of free space remaining within the memory 112, the fill rate, and/or the removal rate, so that the memory 112 is again predicted to become the second percentage full with the raw data 114 when the scanning mechanism 106 has completed scanning of the entire media sheet 102. As before, the first percentage may be 80% and the second percentage may be 20%. Thus, in one embodiment, when the memory 112 is 80% full, the scan rate is adjusted downwards again so that, based on the fill rate and/or the removal rate monitored thus far, it is predicted that the memory 112 will be just 20% full when the scanning mechanism 106 has completely scanned the media sheet 102.

The media sheet 112 therefore is continued to be scanned, but at the third scan rate that is likely less than the first scan rate, to continue yielding the raw data 114 that is temporarily stored within the memory (310). Likewise, the raw data 114 is continued to be processed, to continue to yield the processed data 118 (312), such that the raw data 114 is removed from the memory 112 as the raw data 114 is processed. Upon the media sheet 102 being completely scanned, and the raw data 114 being completely processed, the processed data is output (322), as before.

It is noted that the likelihood that the determination of a third scan rate in part 316 has to be achieved—that is, the likelihood that the memory 112 may again become the first percentage full with the raw data 114—may be relatively low. In such instances, parts 316, 318, and 320 are not performed, but rather the method 200 may proceed from parts 310, 312, and 314 directly to part 322. Furthermore, there is a small likelihood that scanning the media sheet 102 at the third scan rate may also result in the memory 112 again becoming the first percentage full with the raw data 114. As can be appreciated by those of ordinary skill within the art, a fourth scan rate may then be determined in the same manner that the second and third scan rates have been determined, such that scanning continues at this fourth scan rate. In general, scan rate may be adjusted downwards within the embodiment of FIG. 3 at any time the memory 112 becomes the first percentage full of the raw data 114.

It is also noted that the method 300 is a particular implementation by which the scan rate is adjusted at discrete intervals. The discrete intervals are not regular. Rather, the discrete intervals correspond to points in time at which the memory 112 becomes the first percentage full. Thus, each time the memory 112 becomes the first percentage full of the raw data 114, the end of the interval is said to occur, such that a new scan rate is determined, and such that scanning continues at this new scan rate.

Furthermore, the first and the second percentages being 80% and 20%, respectively, provide for a certain amount of leeway in adjusting the scan rate. As to the first percentage being 80%, such a first percentage may more generally be less than 100%. This is because the scan rate is adjusted downwards when the memory 112 becomes the first percentage full of the raw data 114. That is, if the scan rate were adjusted downwards exactly when the memory 112 becomes 100% full of the raw data 114, the scanning mechanism 106 may be required to stop while the new scan rate is being determined and the processing mechanism 116 is removing the raw data 114 from the memory 112 for processing. Therefore, a first percentage less than 100% provides a degree of safety that the scanning mechanism 106 does not have to stop scanning due to the memory 112 becoming 100% full of the raw data 114.

Likewise, as to the second percentage 20%, such a second percentage may more generally be greater than 0%. This is so that the processing mechanism 116, for instance, is not "starved" of raw data 114, such that there is at least always some raw data 114 within the memory 112 for the processing mechanism 116 to process into the processed data 118. That is, if the scan rate were adjusted so that the memory 112 is predicted to become completely empty of the raw data 114 when the end of the media sheet 102 is reached, the memory 112 may nevertheless become completely empty of the raw data 114 before the end of the media sheet 102 is actually reached, due to variability of the image 104 on the media sheet 102. In such instance, the processing mechanism 116 may become starved of raw data 112, resulting in generation of the completed processed data 118 taking more long than need be. Therefore, a second percentage greater than 0% provides for a degree of safety that the memory 112 does not become completely empty of the raw data 114.

Figure 4:
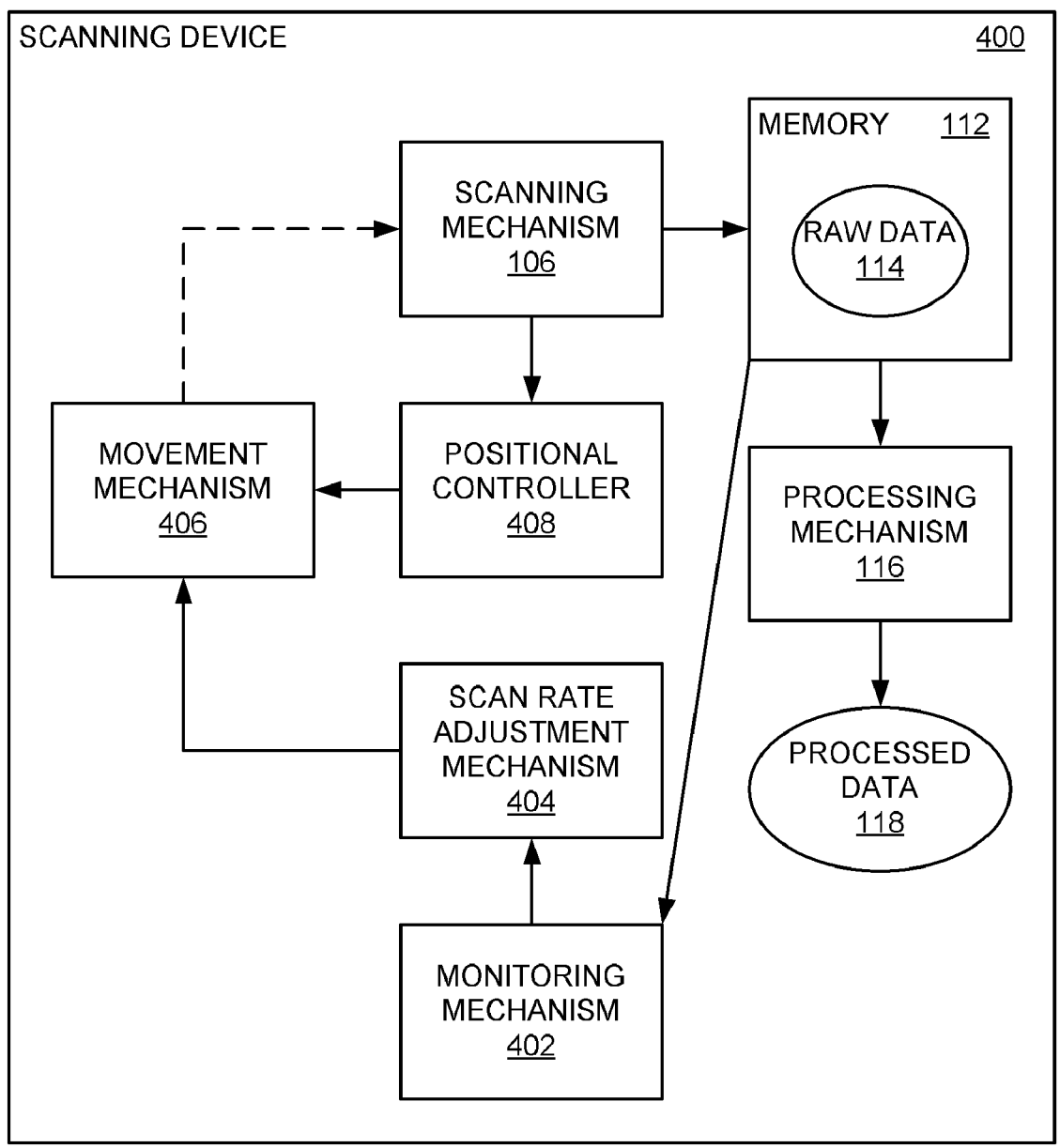
FIG. 4 is a diagram of a scanning device, according to an embodiment of the present disclosure.

FIG. 4 shows a scanning device 400, according to an embodiment of the invention. The scanning device 400 may be a standalone scanner, a multiple-function device (MFD) or an all-in-one (AIO) device that includes scanning functionality, or another type of scanning device. The scanning device 400 includes the scanning mechanism 106, the memory 112, the processing mechanism 116, a monitoring mechanism 402, a scan rate adjustment mechanism 404, a movement mechanism 406, and a positional controller 408. As can be appreciated by those of ordinary skill within the art, the scanning device 400 may include other components, in addition to and/or in lieu of those depicted in FIG. 4. The scanning device 400 can perform the methods 200 and 300 that have been described.

As has been described in relation to FIG. 1, the scanning mechanism 106 scans the media sheet 102 that has the image 104 thereon to generate raw data 114 that is temporarily stored within the memory 112. The processing mechanism 116 generates the processed data 118 from the raw data 114, such that the raw data 114 is removed from the memory 112 as the processing mechanism 116 converts or processes the raw data 114. The scanning mechanism 106 may be implemented in hardware, or a combination of hardware and software. The memory 112 may be considered a memory buffer in one embodiment, and may be volatile semiconductor memory. The processing mechanism 116 may be implemented in software, hardware, or a combination of software and hardware.

The monitoring mechanism 402 may also be implemented in software, hardware, or a combination of software and hardware. The monitoring mechanism 402 monitors the amount of free space within the memory 112, the fill rate of the raw data 114 into the memory 112, and/or the removal rate of the raw data 114 from the memory 112. The scan rate adjustment mechanism 404, which also may be implemented in software, hardware, or a combination of software and hardware, then adjusts the scan rate, which is variable, so that the memory does not become completely full. As such, the scanning mechanism 106 does not have to be stopped before completely scanning the media sheet 102. The scan rate adjustment mechanism 404 adjusts the scan rate based on the amount of free space within the memory 112, the fill rate, and/or the removal rate, as has been described.

The movement mechanism 406 may be hardware, or a combination of hardware and software. The movement mechanism 406 may be a media movement mechanism to move the media sheet 102 in relation to the scanning mechanism 106 at the scan rate determined by the scan rate adjustment mechanism 404, while the scanning mechanism 106 remains stationary. Alternatively, the movement mechanism 406 may be a scanning movement mechanism that moves the scanning mechanism 106 in relation to the media sheet 102 at the scan rate determined by the scan rate adjustment mechanism 404, while the media sheet 102 remains stationary. This latter embodiment is depicted in FIG. 4 by the dotted arrow from the movement mechanism 406 to the scanning mechanism 106.

The positional controller 408 may be hardware, or a combination of hardware and software. The positional controller 408 determines the current position of the scanning mechanism 106 in relation to the media sheet 102. As such, the positional controller 408 together with the movement mechanism 406 form a feedback loop in relation to the scanning mechanism 106. The movement mechanism 406 receives the scan rate as determined by the scan rate adjustment mechanism 404, which determines the scan rate based on the information received from the monitoring mechanism 402, which monitors the memory 112. To verify that the scanning mechanism 106 is moving at the desired rate, the movement mechanism 406 receives information regarding the current (and changing) relative position of the scanning mechanism 106 in relation to the media sheet 102 from the positional controller 408. From this information, the movement mechanism 406 is able to control the scan rate so that the scan rate is equal to that which the scan rate adjustment mechanism 404 has determined.

We claim:

1. A scanning device comprising:
a scanning mechanism to scan a media sheet having an image thereon at a variable scan rate, to yield raw data;
a memory to temporarily store the raw data;
a processing mechanism to convert the raw data within the memory into processed data, the raw data removed from the memory as the raw data is converted; and,
a scan rate adjustment mechanism to adjust the variable scan rate, by:
starting scanning of the media sheet at a first scan rate;
upon the memory becoming a first percentage full with the raw data while scanning at the first scan rate, determining a second scan rate so that the memory is predicted to become a second percentage full with the raw data when the media sheet has been completely scanned, the first percentage different than the second percentage, the first scan rate different than the second scan rate; and,
continuing scanning of the media sheet at the second scan rate.

2. The scanning device of claim 1, further comprising a monitoring mechanism to monitor one or more of the amount of free space within the memory, the fill rate, and the removal rate.

3. The scanning device of claim 1, further comprising one of:
a media movement mechanism to move the media sheet in relation to the scanning mechanism at the variable scan rate, the scanning mechanism remaining stationary; and,
a scanning movement mechanism to move the scanning mechanism in relation to the media sheet at the variable scan rate, the media sheet remaining stationary.

4. The scanning device of claim 1, further comprising a positional controller to determine a current position of the scanning mechanism in relation to the media sheet.

5. The scanning device of claim 1, wherein one of:
the scan rate adjustment mechanism continually adjusts the variable scan rate at which the media sheet is being scanned so that the memory does not become completely full; and,
the scan rate adjustment mechanism adjusts the scan rate at which the media sheet is being scanned at discrete intervals so that the memory does not become completely full.

6. The scanning device of claim 1, wherein the scan rate adjustment mechanism is to further adjust the variable scan rate by:
upon the memory becoming the first percentage full with the raw data again while scanning at the second scan rate, determining a third scan rate so that the memory is predicted to again become the second percentage full with the raw data when the media sheet has been completely scanned, the third scan rate different than both the first scan rate and the second scan rate; and,
continuing scanning of the media sheet at the third scan rate.

7. A method comprising:
scanning a media sheet having an image thereon to yield raw data temporarily stored within a memory;
processing the raw data to yield processed data, the raw data being removed from the memory as the raw data is processed;
adjusting a scan rate at which the media sheet is being scanned, comprising:
starting scanning of the media sheet at a first scan rate;
upon the memory becoming a first percentage full with the raw data while scanning at the first scan rate, determining a second scan rate so that the memory is predicted to become a second percentage full with the raw data when the media sheet has been completely scanned, the first percentage different than the second percentage, the first scan rate different than the second scan rate; and,
continuing scanning of the media sheet at the second scan rate.

8. The method of claim 7, further comprising, upon the media sheet being completely scanned and the raw data being completely processed, outputting the processed data, the processed data corresponding to the image on the media sheet.

9. The method of claim 7, wherein adjusting the scan rate at which the media sheet is being scanned so that the memory does not become completely full comprises continually adjusting the scan rate at which the media sheet is being scanned so that the memory does not become completely full.

10. The method of claim 7, wherein adjusting the scan rate at which the media sheet is being scanned so that the memory does not become completely full comprises adjusting the scan rate at which the media sheet is being scanned at discrete intervals.

11. The method of claim 7, wherein scanning the media sheet having the image thereon to yield the raw data temporarily stored within the memory comprises optically scanning a physical media sheet having the image thereon on a media sheet swath-by-media sheet swath basis.

12. The method of claim 7, wherein scanning the media sheet having the image thereon to yield the raw data temporarily stored within the memory comprises scanning a physical media sheet having the image thereon by using a stationary scanning mechanism in relation to which the physical media sheet is moved.

13. The method of claim 7, wherein scanning the media sheet having the image thereon to yield the raw data temporarily stored within the memory comprises scanning a physical media sheet having the image thereon by using a movable scanning mechanism that moves in relation to which the physical media sheet, the physical media sheet remaining stationary.

14. The method of claim 7, wherein scanning the media sheet having the image thereon to yield the raw data temporarily stored within the memory comprises optically scanning a physical media sheet having the image thereon to yield the raw data temporarily stored within the memory, the raw data corresponding to the image on the media sheet.

15. The method of claim 7, wherein processing the raw data to yield the processed data comprises processing the raw data to yield the processed data, the processed data corresponding to the image on the media sheet.

16. The method of claim 7, wherein adjusting the scan rate at which the media sheet is being scanned further comprises:
   upon the memory becoming the first percentage full with the raw data again while scanning at the second scan rate, determining a third scan rate so that the memory is predicted to again become the second percentage full with the raw data when the media sheet has been completely scanned, the third scan rate different than both the first scan rate and the second scan rate; and,
   continuing scanning of the media sheet at the third scan rate.

\* \* \* \* \*